Dec. 3, 1940. E. A. STALKER 2,223,743
VARIABLE SPEED TRANSMISSION
Original Filed April 12, 1937   7 Sheets-Sheet 1

Inventor,
Edward A. Stalker

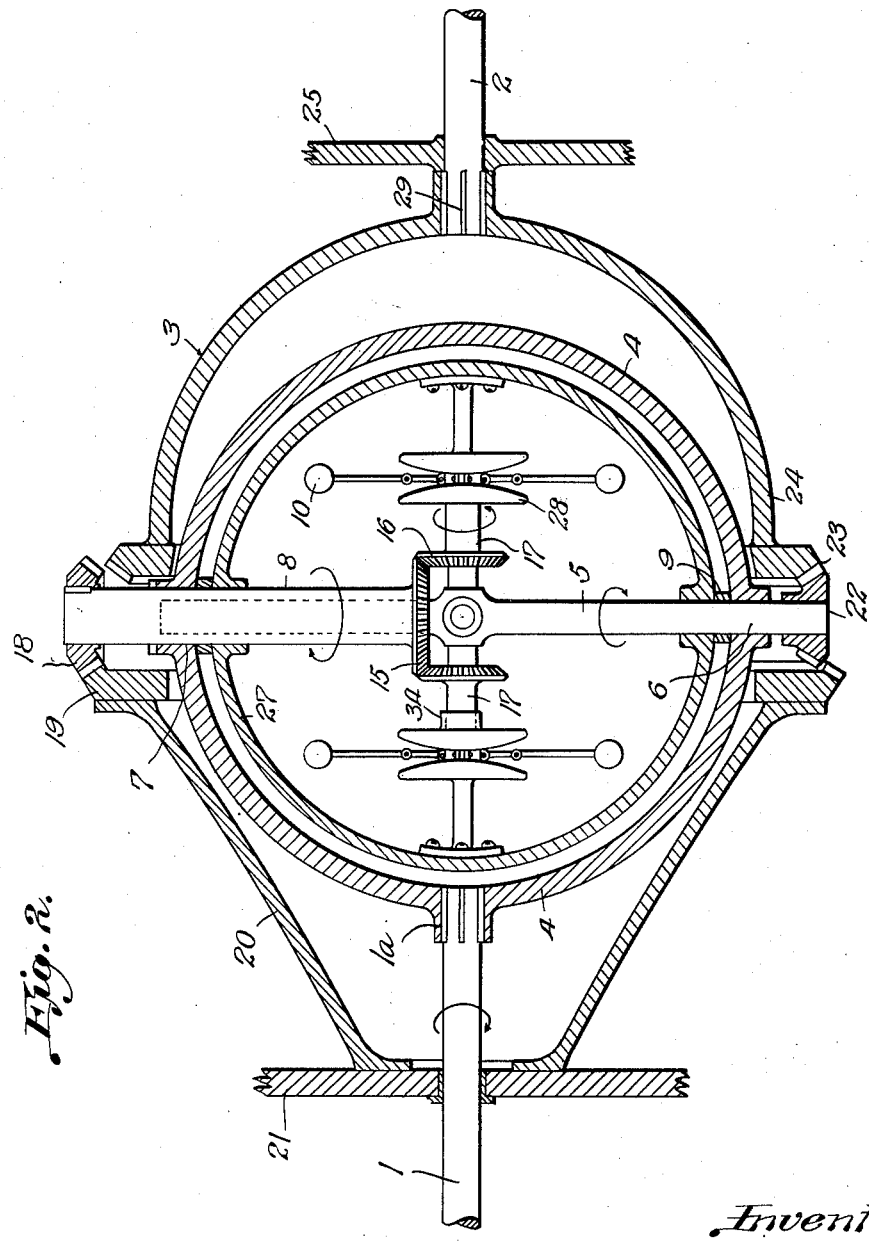

Inventor
Edward A. Stalker

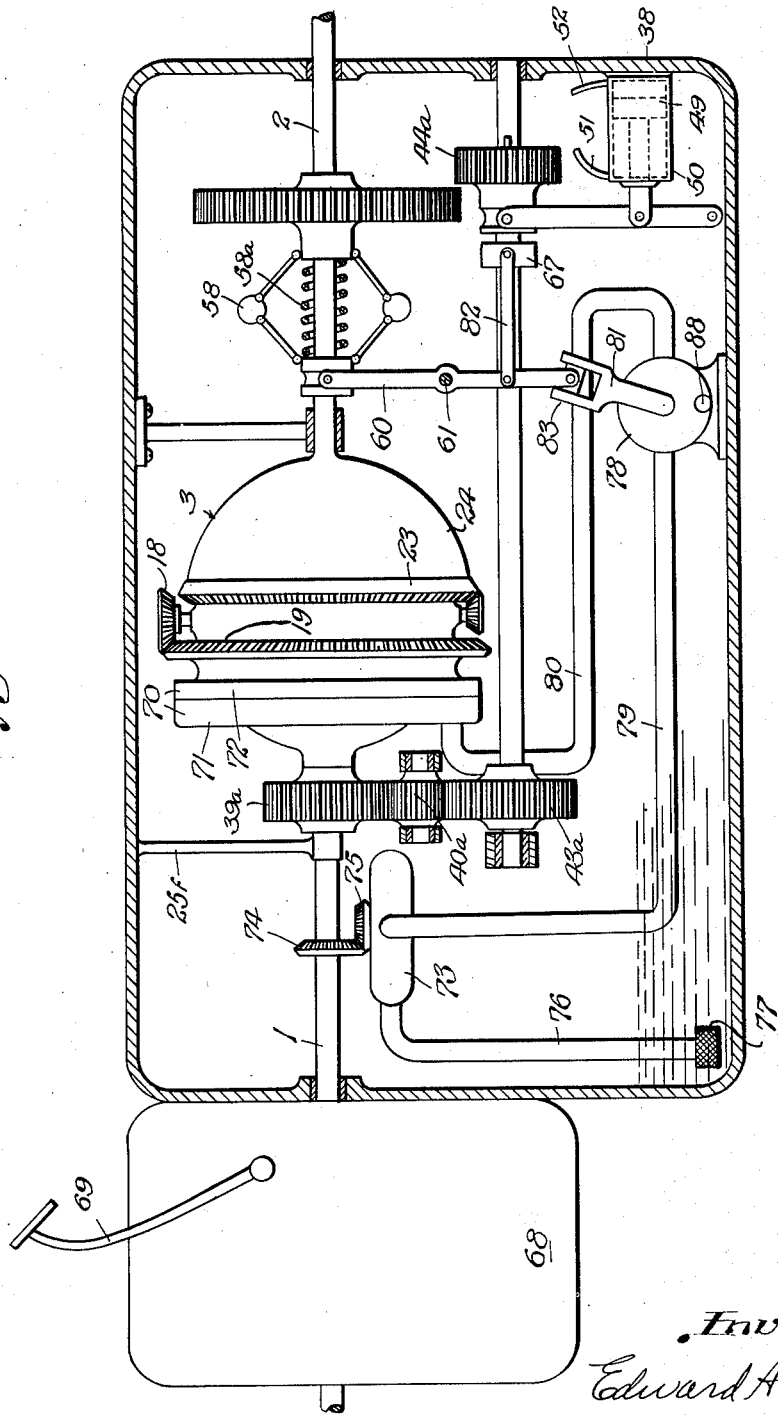

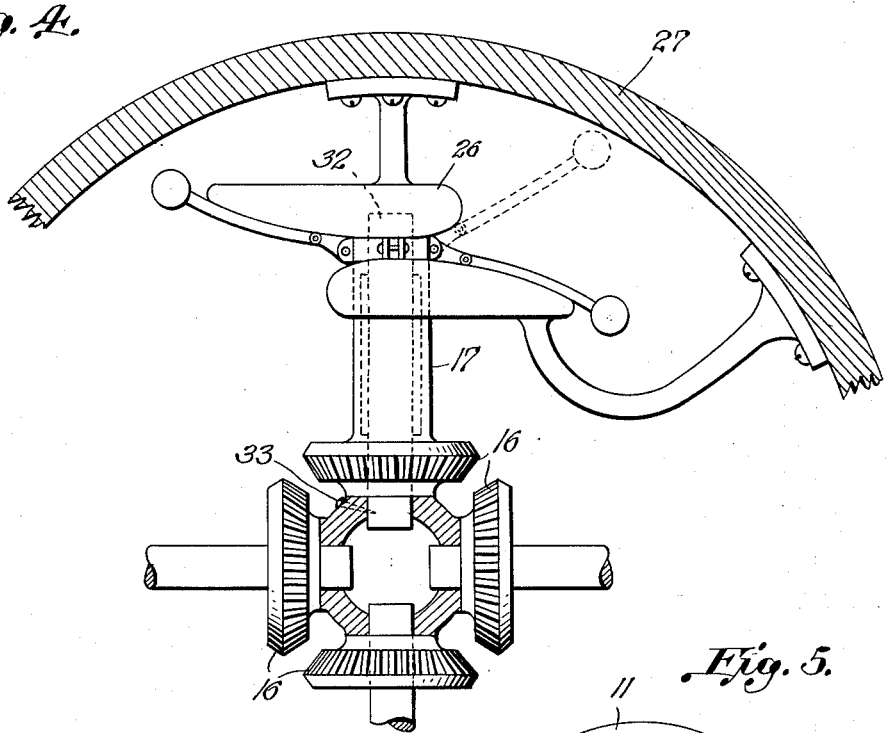
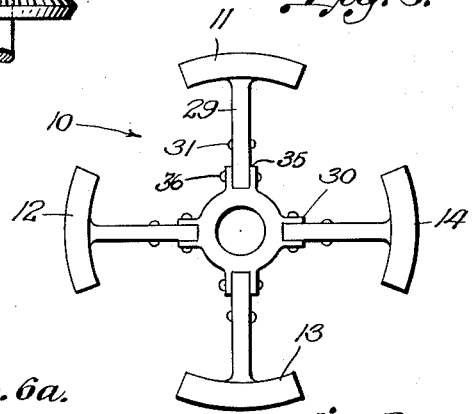
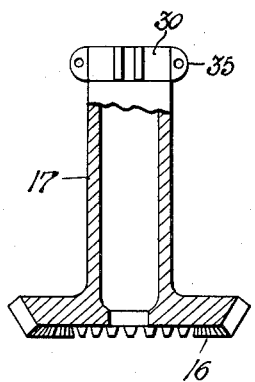
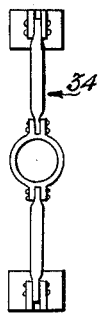
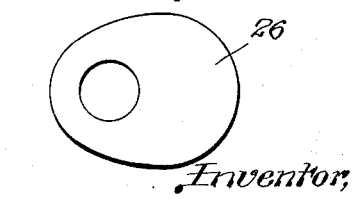

Dec. 3, 1940.  E. A. STALKER  2,223,743
VARIABLE SPEED TRANSMISSION
Original Filed April 12, 1937  7 Sheets-Sheet 7

Inventor,
Edward A. Stalker

Patented Dec. 3, 1940

2,223,743

UNITED STATES PATENT OFFICE 2,223,743

VARIABLE SPEED TRANSMISSION

Edward A. Stalker, Ann Arbor, Mich.

Application April 12, 1937, Serial No. 136,437
Renewed April 25, 1940

10 Claims. (Cl. 74—5)

This invention relates to a variable speed transmission and contains matter in common with my prior application Serial No. 700,121, filed November 28, 1933, entitled Torque converter.

One object is to provide a mechanism to convert a given torque and angular velocity to a different torque and angular velocity. Another object is to accomplish the conversion automatically in accordance with the torque requirements of the machine wherein the variable speed transmission is employed.

I attain the above objects by the mechanism illustrated in the accompanying drawings in which—

Figure 2 is a fragmentary vertical section in the plane of the paper of the drawings Figure 1;

Figure 4 is a part section along the line 3—3 in Figure 1 to illustrate on a larger scale than Figure 3 the gyroscope and its associated mechanism;

Figure 5 is a plan view of a gyroscope;

Figure 6 is an axial section of the gear and shaft to which the gyroscope masses are attached;

Figure 6a is a view of frame 34 at right angles to the plane of the paper of Figure 3 and along the axis of symmetry of shaft 17;

Figure 7 is a plan of one of the guides for the gyroscope;

Figure 14 is an elevation partly in section of a clutch and transmission employing hydraulic control such as can be used in a motor vehicle;

Figure 1:
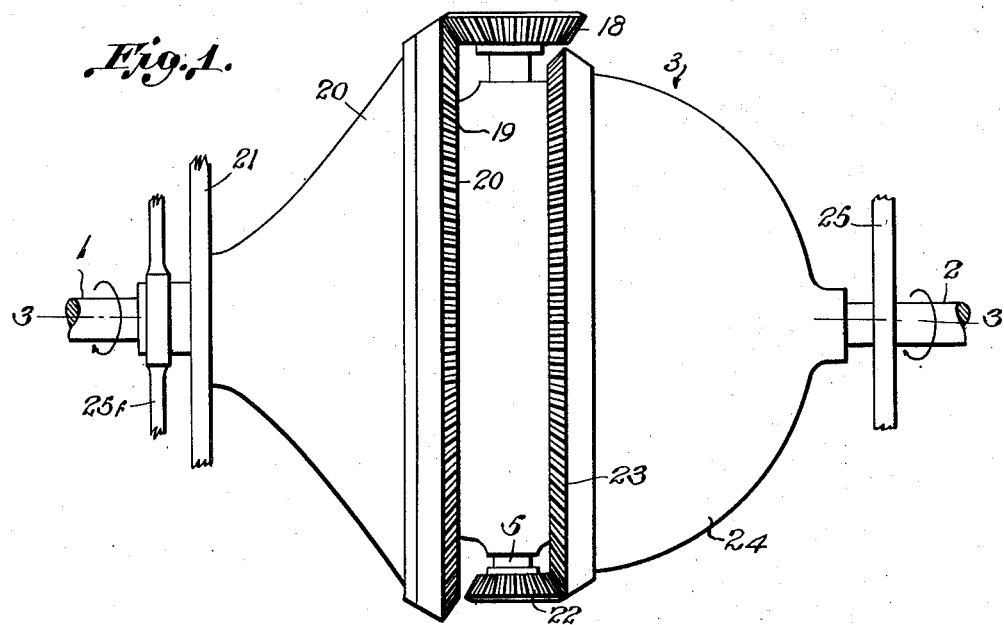
Figure 1 is a side elevation of the torque converter of the variable speed transmission.
Figure 3:
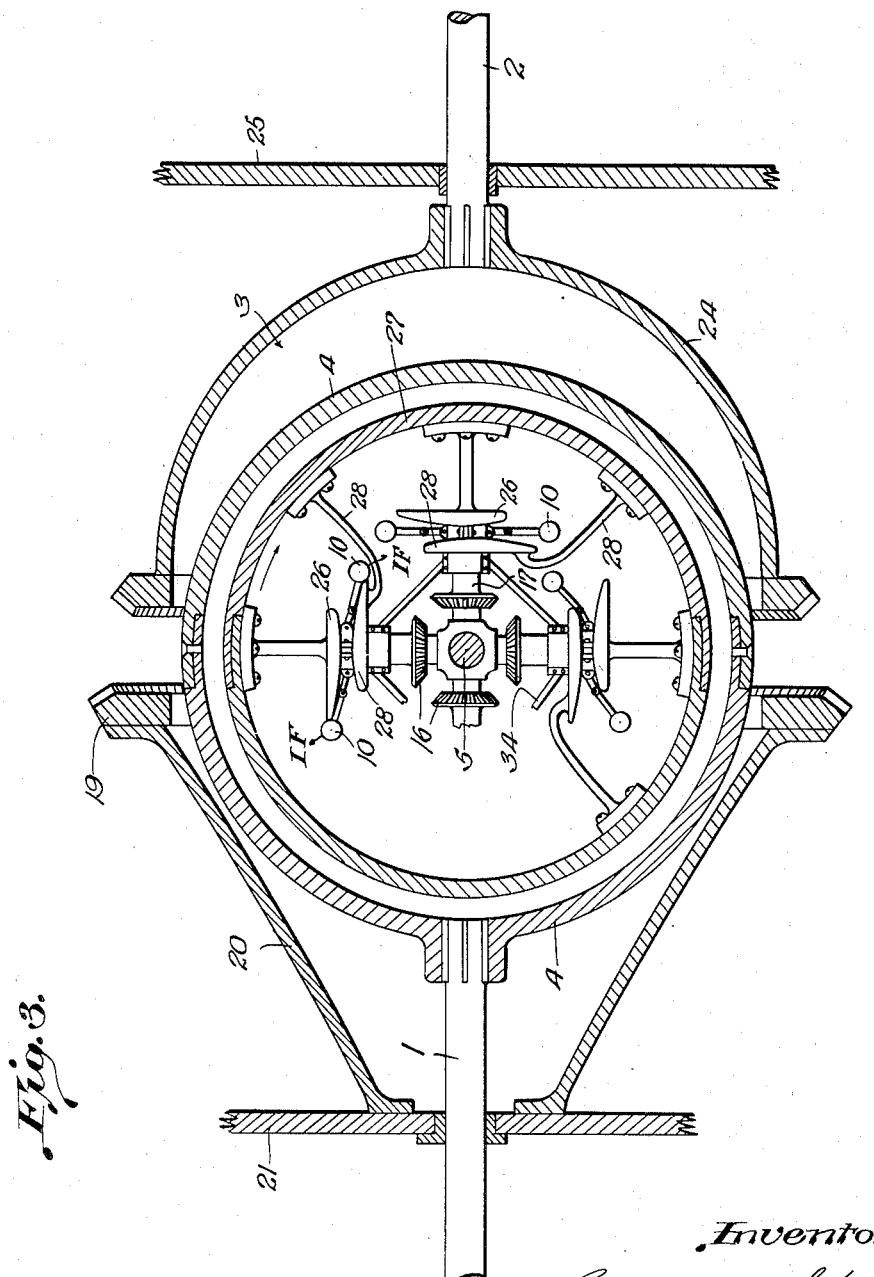
Figure 3 is a section along the line 3—3 in Figure 1.

Referring to Figures 1, 2 and 3, and particularly to Figure 2, the drive shaft is 1 and the driven shaft is 2. The two shafts have a gyroscopic mechanism 3 relating them so that the torque of shaft 1 is converted to a torque of shaft 2 of a different value. The rates of rotation of shafts 1 and 2 are then necessarily different since the energy transmitted remains the same.

At the end of shaft 1 the spherical shell 4 is rigidly attached by the splines 1a. Through its diameter and at right angles to the shaft 1 is the shaft 5 carried at one end in the bearings 6 and at the other end in the sleeve 8 and bearing 7. Mounted on the shaft 5 are four gyroscopes 10, each composed of four segments. See Figures 4 and 5 also. The gyroscopes are composed of four segments 11, 12, 13 and 14. It is not necessary to use only four. Any convenient number may be used.

As shown in Figures 2, 3 and 4 the gyroscope 10 is spun by the gears 15 and 16. The gear 15 engages the gear 16 which is integral with the hollow shaft 17 to which are attached the gyroscopic segments 11, 12, 13 and 14. The gear 15 is integral with the sleeve 8 which carries the bevel gear 18 at the outer end. The bevel gear 18 meshes with the bevel gear 19 which is fixed to the stationary support 20 in turn supported by part 21. The shaft 5 carries at the opposite end the bevel gear 22 which meshes with the gear 23 fixed to the shell 24. By means of the splines 2a the gear 23 can turn the shaft 2 which is rotatably borne in the support 25. Collars 9 position the shafts 5 and 8.

The rotation of shaft 5 about the axis of 1 rotates the gyroscopes about their own axes and according to gyroscopic theory there will arise a gyroscopic torque about the shaft 5 as indicated by the inertia forces IF in Figure 3. This torque is in such a direction that shaft 5 and gear 22 carried thereon rotate as indicated in Figure 2. It will now be apparent that due to the torque of gear 22 the gear 23 and shaft 2 will be turned. The magnitude of the gyroscopic or precessional torque about shaft 5 will determine the torque of shaft 2 in part.

It is to be noted if the gyroscope rotates about the precessional axis (axis of shaft 5) that after a 180 degree turn the precessional torque is reversed in direction for the same direction of rotation about the axis of 1, the torque input axis. In order to insure an unindirectional torque provision is made to exert a substantial driving force only when the gyroscopes are on one side of the precessional axis.

In Figure 3 is shown the shell 27 journaled on the shaft 5 and sleeve 8. This shell supports the guides 26 and 28 one of which is shown alone in Figure 7. The gyroscopic segments are each composed of a rim piece and a flexible member 29. These are hinged to the hub by means of the clevises 35 and pin 36. See Figures 5 and 6. The flexible members are hinged to the hub 30 and also have a flexible joint 31 a short distance out from the hub. When the gyroscope is at the top as shown in Figure 3 the gyroscopic force presses the gyroscopes against the guides 26 and 28. The guide surfaces adjacent to the gyroscope are curved so that the gyroscope rotates smoothly between them. Because of the unique juxtaposition of the guides, the gyroscopes are free to take up the unrestrained position at the bottom of Figure 3. In this position they exert only a very small torque opposing the torque of the top gyroscope.

The gyroscope torque is transmitted to the shaft 5 through the agency of the shafts 32 fixed in the shaft 5 by the pins 33. The guides 26 also support the outer ends of the shafts 32. See Figure 4. These shafts are also supported laterally by each other through the frame 34 which bears on the hollow shafts 17. This frame has suitable bearings in which the shafts 17 are journaled. Frame 34 is also shown in Figure 6a.

It will now be clear that a rotation of shaft 1 will rotate the gyroscopes about their own or spin axes which in combination with their rotation about the axis of shaft 1 or torque input axis will give rise to a unidirectional torque about the axis of shaft 5 or precessional axis. The gear 22 applies the precessional torque to the bevel gear 23 and hence to the driven shaft 2.

It will also be clear that one of the basic principles of this gyroscope torque converter is the rotation of a gyroscope segment about a fourth axis. This axis can be the axis of the hinge 31 or an instantaneous axis about which the flexible member 29 rotates. That is the flexibility of the member 29 permits the rotation of the gyroscopic segment about any number of fourth axes depending only on the degree of contact between the flexible segments and the guides.

It is to be noted that the precessional member or shaft 5 is also a driven member as well as shaft 2.

In Figure 3 are shown the inertia forces IF acting on the gyroscopic masses when restrained by the guides. Since the inertia force on the mass tends to straighten the flexible member 29 the degree of contact between the guide and the flexible member is progressive and contact is made without shock.

Figure 8:
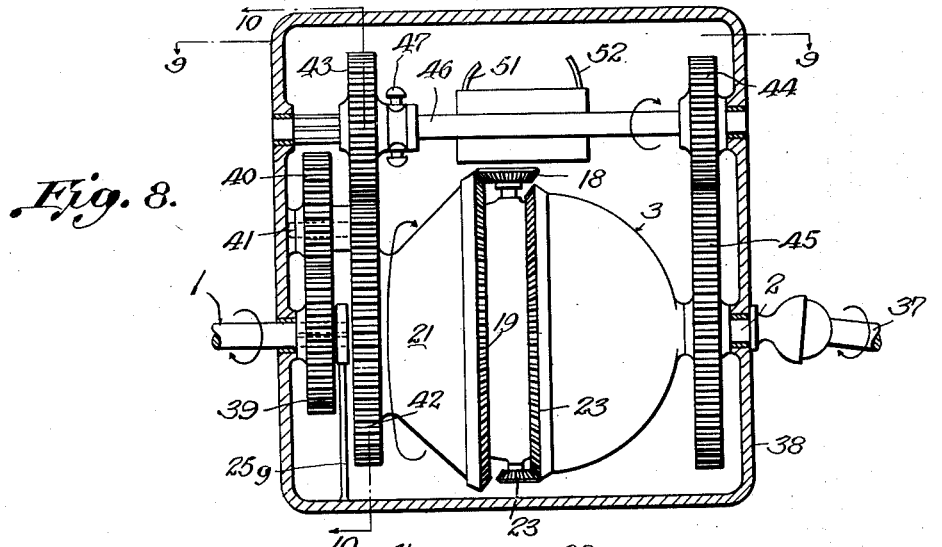
Figure 8 is a plan view of the preferred transmission with the case in section to expose the internal mechanism.

The device is suitable for any type of drive where an infinitely-variable-speed transmission is desirable, as in the automobile. An application is shown in Figure 8. The shaft 1 is the shaft connected to the engine (not shown) and 2 is the drive shaft connected to the rear wheels by the propeller shaft 37. The torque converter 3 is enclosed in the casing 38. The automobile itself is not shown. As the engine starts to turn shaft 1 the shaft 5 is rotated and the gyroscopes made to spin. Because of the inertia and the resistance of the automobile wheels the shaft 2 does not turn. As the throttle is opened further the rotor spin increases and the gear 22 offers progressively more torque until subsequently the torque of 23 arising from the rotation of the gyroscopes about the torque input axis is at least sufficient to rotatably restrain gear 22 and turn shaft 2. The automobile then gets under way and with further opening of the throttle gains speed progressively. At some throttle setting and for given road conditions the torque of gear 22 will be just sufficient to turn gear 23 without relative movement between these gears. With still further opening of the throttle and for given road resistance the gear 22 will turn gear 23 and shaft 2 at a greater angular rate than shaft 1. That this is true may be demonstrated with an ordinary toy gyroscope.

It is common experience to those who have played with gyroscopes that they will make many complete precessional turns in a given direction before they fall to the ground. It is also common experience with tops, which are gyroscopes, that a great many precessional turns are made before the top topples over. In fact, when the energy of the spin is about spent and the top is "dying" the precession becomes very rapid and a great number of turns are made while the upper end is falling through a small arc or, in any case, an angle much less than 180°. Many turns are necessary to dissipate by friction at the point or pivot of the top the energy represented by the elevation of the center of gravity of the top.

In the case of the variable speed transmission the end for end rotation of shaft 5 corresponds to the falling or toppling over of the top. The precessional torque and rotation are exhibited by the gear 22 and correspond to the precession of the top as evidenced by the wobbling of its upper end. It is thus apparent that the torque converter can provide for an overdrive of shaft 2 relative to shaft 1.

Returning to the case of the immobile automobile, it is to be noted that the gyroscopes when not precessing offer no gyroscopic resistance to the rotation of the driving shaft although they offer a high torque tending to precess the gyroscopes. There is, of course, energy expended in overcoming the friction of the mechanism to spin the gyroscopes but this is very small. Since the gyroscopes do not precess, the driving shaft expends no power because power is the product of torque and angular velocity and in the immobile vehicle the latter velocity is zero. Since this is so the driving shaft, which may be assumed to be the engine crank shaft, will attain the highest rate of rotation of which the engine is capable. The torque will then be a maximum but the power output is near the minimum since only frictional forces of the mechanism are being overcome. The maximum power is used when the car is travelling at high speed and the product of precessional torque and precessional angular velocity is a maximum.

The device is suitable as a coupling or transmission for the great speed reductions required in certain machinery as, for instance, between turbines and slow speed machines driven thereby. It is also suitable in many types of machinery where an infinitely variable speed is desired. The device is not limited in use to the automobile. Since there are only two gears transmitting power the efficiency of reduction is very high. The actual power used in driving the gyroscopes is very small representing only the bearing friction so that the loss in the gear drive of the gyroscopes is negligible in comparison to the power transmitted through the gears 22 and 23. The device may be of any size.

It is to be noted, moreover, that in the mechanism described the rate of spin ω is proportional to the angular velocity of the driving shaft. The precessional torque of one gyroscope is $T = I\omega X$ ($I$ = polar moment of inertia of one gyroscope and $\Omega$ equals the torque input angular velocity) so that the torque T mounts as the square of the angular velocity of the driving shaft. This ensures a very high starting torque and is a feature of this invention.

Another feature of this invention is that the precession of the gyroscope adds to the rate of spin of the rotors. It may be observed in Figure 2 that the precession of the gyroscope in the direction indicated by the arrow about the shaft 5 results in a relative movement of gears 15 and 16. This relative movement adds to the rotation imparted by gear 18 to gear 15. Thus if there is no precession the spin is determined entirely by the rate of rotation of gear 18 but as soon as precession begins the precessional rotation, increased by the gear ratio, is added to the spin.

The augmentation of the spin by the gear ratio is important because it permits the driven shaft to be overdriven relative to the driving shaft at a greater rate than otherwise.

The transmission is so arranged that the direction of rotation of the propeller shaft 37 is reversible and the rate of spin of the gyroscopes can be altered.

The driven shaft 1 has splined to it the gear 39 in mesh with the gear 40 on the jack shaft 41. These gears are always in mesh. The gear 19, which controls the rate of spin of the gyroscopes through the gear 18, is rotatable about the shaft 1 relative to the transmission case 38 instead of being fixed as shown in Figure 2. The rate of rotation of gear 19 is made to depend on the driven shaft 37 by means of gears 42, 43, 44 and 45. The gear 19 is connected to the gear 42 by the housing 21 which, with gear 42, is rotatable about shaft 1. The shell 4 is still fixed to shaft 1 and turns with it. The gears 43 and 44 are carried on the jack shaft 46 rotatably mounted in suitable bearings in the transmission case 38. Gear 44 is fixed to shaft 46. It will be clear that a rotation of shafts 2 and 37 will rotate the jack shaft and with it the gear 43 which is splined to the jack shaft. The gear 43 may be slid along the jack shaft 46 to engage either with the gear 40 or the gear 42.

Figure 9:
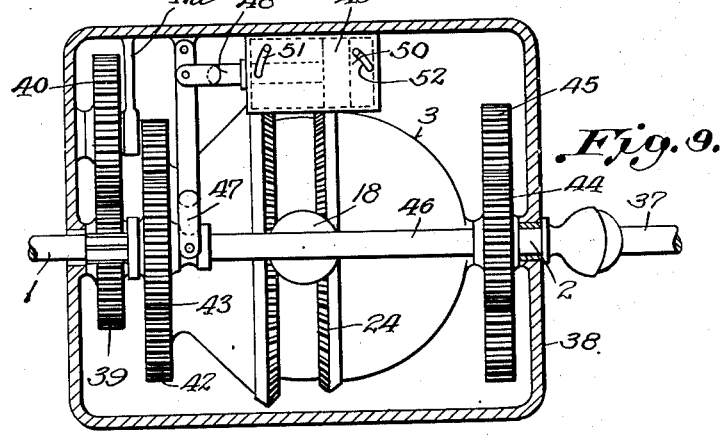
Figure 9 is a horizontal section taken along the line 9—9 in Figure 8.
Figure 10:
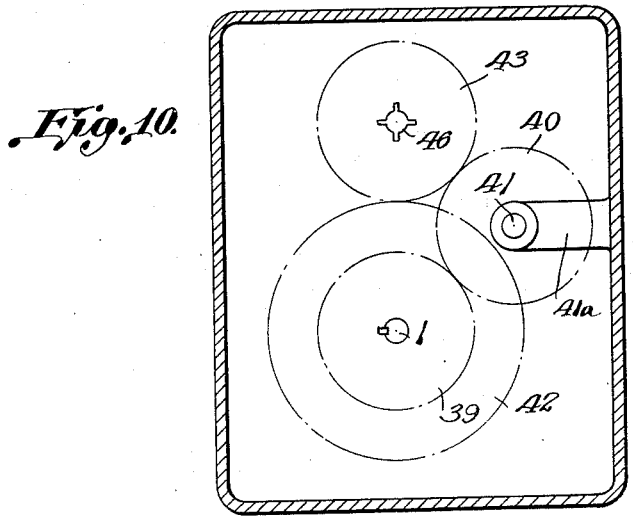
Figure 10 is a section taken along the line 10—10 in Figure 8 to illustrate the position of the transmission gears represented by their pitch circles and shafts.

As shown in Figures 8, 9 and 10, gear 43 meshes with gear 42 and when shaft 37 is stationary gear 42 is also. This gives the maximum rate of spin to the gyroscopes. As shaft 37 begins to turn, gear 42 is rotated in the same direction as the shaft 1 so that the rate of relative motion between gears 18 and 19 is reduced, thus reducing the rate of spin of the gyroscopes. This reduces the driving torque. With this arrangement the torque applied to shaft 37 increases as the rate of rotation of shaft 37 decreases. In an automobile this is a desirable condition.

Figure 10 shows a vertical section of the case 38 and only the pitch circles and shafts of the gears. The support arm 41a for shaft 41 is also shown. It will be readily seen that an axial shift of gear 43 will permit engagement with either gear 40 or 42.

To reverse the direction of rotation of shaft 37, gear 43 is shifted into mesh with gear 40. As shown in Figures 8 and 9 the axis of gear 40 is offset relative to shafts 1 and 46 to accommodate the meshing of gears 43 and 40. It will be apparent that the introduction of gear 40 will reverse the direction of shaft 37 relative to shaft 1.

When gear 42 is out of mesh with gear 43, gear 19 turns freely with gear 18. The gyroscopes cease to spin and hence no torque is transmittable through the torque converter 3 to the shaft 37. Hence the reverse drive is unencumbered by any opposite torque from the torque converter.

Figure 11:
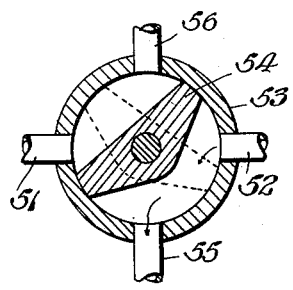
Figure 11 is a section of a control valve taken in the plane of the paper of Figure 12.
Figure 12:
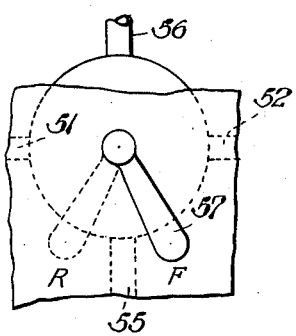
Figure 12 is a front view of the control valve.

I shift the gear 43 by means of the yoke rod 47 and the piston rod 48 carrying the piston 49 encased in the cylinder 50. Pressure applied to the piston will shift the gear 43. Tubes 51 and 52 leading to each end of the cylinder will supply a pressure difference between some convenient sources, such as between the engine manifold and the atmosphere. The tubes 51 and 52 lead first to a valve placed close to the operator of the machine. In the case of the automobile, on the instrument board. A suitable valve is shown in Figures 11 and 12.

The valve case is 53 enclosing the rotatable element 54. The tube 55 leads to a source of suction such as the engine intake manifold and tube 53 opens to the atmosphere. For the valve lever 57 in the solid line position F the element 54 is as shown in Figure 11 when the suction from the tube 55 holds the piston 49 in Figure 10 in the position there shown. Turning the handle 57 to the reverse position marked R the element takes up the dotted position in Figure 11 and the piston 49 takes up a position at the other end of the cylinder and the gears go into the reverse position as described earlier.

Oiling of the gears will be readily provided by conventional means familiar to those skilled in mechanical arts. The mechanism within the shell 4 can, for instance, be readily oiled by filling the shell with an oil which will be readily splashed about by the mechanism itself.

Where the relation of the spin of the gyroscopes to the driven shaft is fixed by a gear train, as in Figure 8, the rate of spin of the gyroscopes has a linear relation to the rate of rotation of the driven shaft. Thus for the construction shown in Figure 8, if the rate of spin of the gyroscopes is plotted as ordinates against the rate of rotation of the driven shaft these points lie on a straight line. For many uses it is desirable to have the torque of the driven shaft increase at a faster rate than a linear rate. This may be accomplished through the use of means to rotate the gear 19 at speeds varying non-linearly with the rotation of the driven shaft. Electric and hydraulic engines are especially suitable for this purpose. In the former the electric resistance in the field or armature is readily designed to produce any rate of increase (or decrease) of motor speed. In the latter, valves or fluid resistances can accomplish the purpose.

Figure 13:
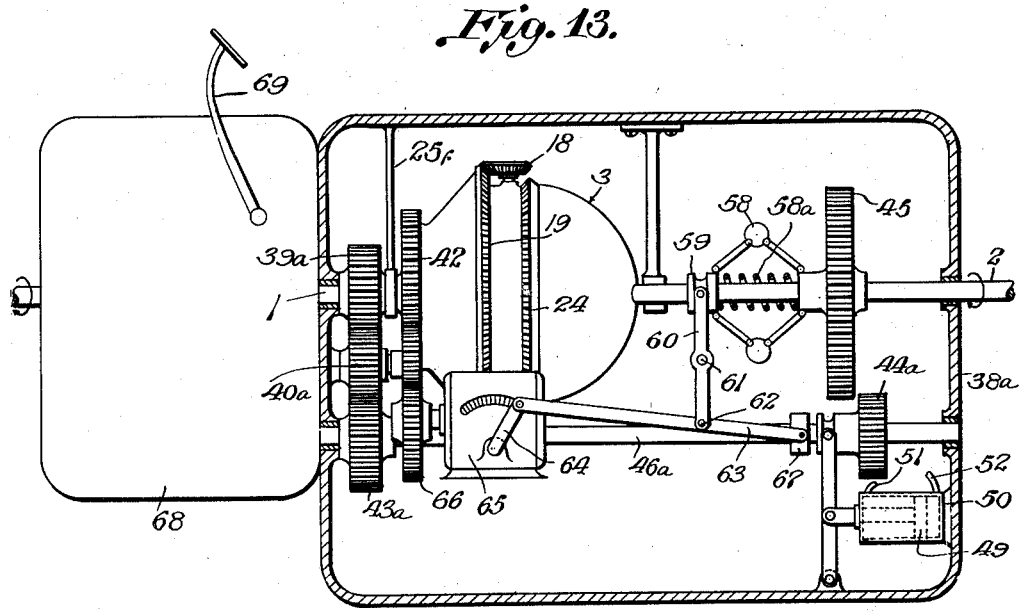
Figure 13 is a vertical elevation of a clutch and transmission employing electrical control such as can be used in a motor vehicle, the transmission case being shown in section.

Figure 13 illustrates the application of an electric motor drive for the gear 19. In this variation a wide variety of functional relations may be had between the rate of rotation of shaft 2 and the shaft 1. That is, the magnitude of the torque can be designed for any number of functional relations to the speed of the shaft 2, in contrast to the fixed type of variation provided by the gears in Figures 8, 9 and 10.

Shaft 2 carries a ball governor 58 attached to the gear 45. As the speed of shaft 2 increases the balls fly outward to move the element 59 toward the gear 45. This movement operates the lever 60 rotatably supported on the shaft 61. The lever 60 is pin connected to the rod 63 which is in turn connected to the arm 64 controlling the field resistance of the electric motor 65. Thus as the shaft 2 speeds up, the speed of the motor can be reduced. Since the motor shaft carries the gear 66 in mesh with gear 42 the rate of rotation of gear 42 is controlled and with it the rate of spin of the gyroscopes in similar fashion to the method of Figure 8. It is also possible to control the armature current as well as the field current. By a suitable selection of the motor characteristics the rotation of the gear 42 may be given a wide variation of values for any rotation of the shaft 2.

To reverse the direction of shaft 2 relative to shaft 1 the gear 44a is moved into mesh with gear 45 by the cylinder device previously described. The gear 44a when in mesh with gear 45 moves the collar 67 along the shaft 46a so that the lever 64 is in the off position and the gear 66 is then free to turn with the gear 42. Thus the spin of the gyroscopes is brought to zero as described previously. It is to be noted that the gear 44a is slideably mounted on splines on shaft 46a and is not integral with collar 67. The latter is slideable along the shaft also.

The shaft 46a is able to reverse the direction of rotation of shaft 2 because of the intermediate gear 40a in mesh always with the gears 39a and 43a, each of the last two being splined or keyed to their respective shafts.

Figure 13 also shows the relation of the transmission in case 38a to the clutch 68 having the operation foot pedal 69. The clutch, as customary, is placed between the engine and the transmission.

Figure 14 shows still another variation of the invention. It differs from Figure 13 in that a control turbine is used to rotate the gear 19 for control of the rate of spin of the gyroscopes.

The turbine is 70, of which the nozzle box is 71 and the blade rotor is 72. Oil is used as a fluid to actuate the turbine and it is furnished by the gear pump 73 driven from shaft 1 by the gears 74 and 75. Oil is drawn into the pump through the tube 76 opening into an oil supply in the bottom of the case 38. A strainer 77 is provided.

Oil from the pump goes to a valve 78 through a tube 79 and then to the nozzle box by way of tube 80. The flow through valve 78 is controlled by the governor 58 and lever 60 actuating the valve lever 81. The collar 67 serves the purpose of shutting off the valve 78 so that only a reverse torque is applied to the shaft 2. The collar 67 is actuated by the contact of the gear 44a. The rod 82 transmits the motion to the rod 60 and thence to the valve lever 81. The valve lever is forked and contains within the jaw the sliding block 83 which serves to accommodate the relative displacements between the lever 81 and the rod 60.

Figure 15:
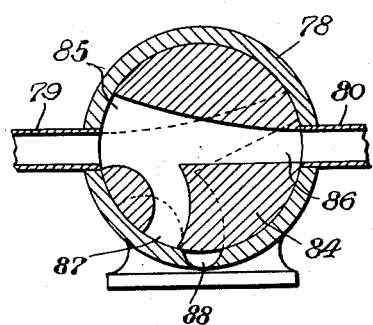
Figure 15 is a section of the valve employed as a part of the hydraulic control illustrated in Figure 14.
Figure 16:
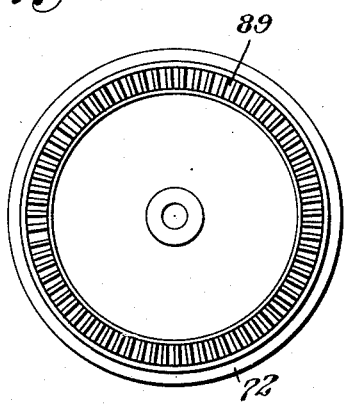
Figure 16 illustrates in front elevation the rotor of the control turbine showing the blades.

The valve 78 is shown in cross section in Figure 15. The valve lever 81 shown in Figure 14 turns the cylinder 84. The cylinder contains the passage having the end openings 85 and 86, as well as the branch passage ending at 87. The pump delivers the fluid to the valve by way of tube 79. All of the fluid may be delivered to the turbine by the tube 80 or some may be by-passed through the branch passage 87 for discharge through the valve case opening 88. This fluid then returns to the supply in the case 38.

A movement of the valve lever 81 gradually closes the opening of 86 into the tube 80 and leads to registration between the opening 87 and the by-pass 88.

As shown in Figure 15 the valve 78 is wide open so that a full complement of fluid flows to the turbine. This is also the condition of the valve in Figure 14, and the turbine rotor 72 is being spun at maximum speed in a direction opposite to the direction of rotation of shaft 1. Thus the gyroscopes are being spun at maximum rate. The torque on shaft 2 is therefore a maximum. As shaft 2 gains speed the balls of the governor 58 fly outward and the flow through valve 78 is progressively decreased so that the turbine rotor spins less slowly and therefore the gyroscope rotors also.

The valve 78 is closed completely by the collar 67 when it is shifted by the gear 44a but normally the valve 78 is not closed even at the highest speeds of the shaft 2.

Figure 17:
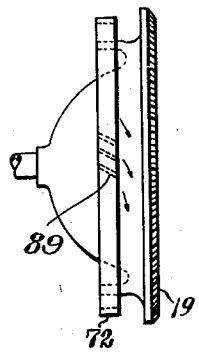
Figure 17 is a side elevation of the rotor in Figure 16.
Figure 18:
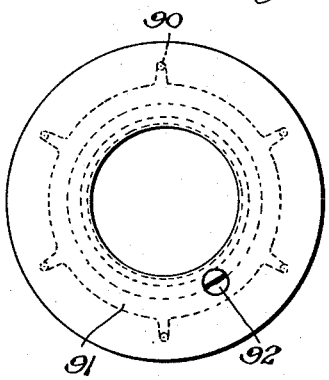
Figure 18 is a front elevation of the nozzle box for the turbine.
Figure 18A:
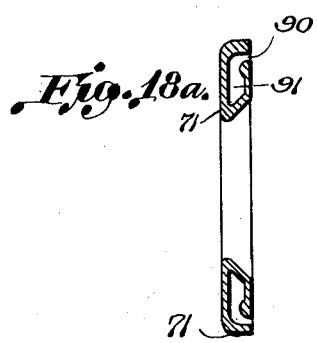
Figure 18a is a side elevation of the nozzle box of Figure 18.

The details of the turbine are shown in Figures 16, 17, 18 and 18a. The former Figures 17 and 17a show the turbine blades 89, while the Figures 18 and 18a exhibit the nozzles 90. The two parts of the turbine 71 and 72 fit together as exhibited in Figure 14

The nozzle box 71 has the annular passage 91 within, out of which lead the plurality of nozzles 90. The inlet to the nozzle box passage 91 is 92.

The parts 25f and 25g and 41a shown in Figures 8, 13 and 14 are simple bearing supports.

While I have illustrated specific forms of the invention it is to be understood that I do not limit myself to these exact forms or their specific application. Rather I claim broadly my invention as defined in the scope of the following claims.

I claim:

1. In combination, a precessional member adapted for rotation about a precessional axis of rotation, a mass having a spin axis, means including said precessional member for mounting said mass for simultaneous rotations about three mutually transverse axes namely a torque input axis, said precessional axis, and said spin axis, a driving member rotatable about the torque input axis adapted to rotate the mass thereabout, means to impart a unidirectional spin to the mass about the spin axis, said means for mounting the mass being adapted for the alteration of the path of spin of the mass relative to the said precessional member, and means to control the mass so that the said alteration of the path relative to the precessional member results in the precessional member receiving a substantially unidirectional torque from the precessional effort of the mass.

2. In combination, a precessional member adapted for rotation about a precessional axis of rotation, a mass having a spin axis, means including said precessional member for mounting said mass for simultaneous rotations about three mutually transverse axes namely a torque input axis, said precessional axis, and said spin axis, a driving member adapted to rotate the mass about the torque input axis through a complete turn thereabout, means to impart a spin to the mass about the spin axis, said means for mounting the mass being adapted for the alteration of the path of spin of the mass relative to the said precessional member and means to control the mass so that the said alteration of its path results in the precessional member receiving a substantially undirectional torque from the precessional effort of the mass.

3. In combination, a rotating driving member, a rotatable driven member, gyroscopic means incorporating a gyroscope having a unidirectional spin and a precessional member rotatable about the precessional axis, both associated with said members and cooperating with them to transmit a variable torque therebetween, and means to determine the rate of spin of the gyroscope as a function of the difference in speeds of rotation of the driving and driven members.

4. In a gyroscopic torque converter in combination, a driving element, a driven element, a gyroscopic mass having a spin axis, means for mounting said mass for simultaneous rotation about three mutually transverse axes namely a torque input axis, said spin axis and a precessional axis and for imparting rotation to said mass about the torque input axis by the driving element, means to impart a spin to said mass about the spin axis, and means to apply the precessional torque of said mass about the precessional axis to the driven element, said mass being comprised of a rigid body constrained to rotate about the axis of spin by an arm substantially flexible in the direction of the axis of spin, said first named means including a supporting means for the said mass adapting it for controlled flexing of said arm in coordination with the rotation of the mass about one of said three axes so that said driven element is subject to a substantially unidirectional torque arising from the rotations of said mass.

5. In a gyroscopic torque converter having in combination, a driving element, a driven member, a gyroscopic mass, means for mounting said mass for simultaneous rotation about three mutually transverse axes namely a torque input axis, a spin axis and a precessional axis, and for imparting rotation to said mass about the torque input axis by the driving element, means for imparting a spin to said mass about the spin axis, said first named means including a supporting means for said mass adapting it for controlled inclination with respect to said driving element about a fourth axis transverse to said spin axis and means to control the gyroscopic torque of said mass about the said fourth axis and the precessional axis and to apply the precessional torque to the driven member so that said driven member is subject chiefly to a unidirectional precessional torque arising from the rotation of said mass about the torque input and spin axes.

6. In a gyroscopic torque converter having in combination, a driving element, a driven member, a gyroscopic mass having a spin imposed thereon about a spin axis, means for mounting said mass for simultaneous rotation about three mutually transverse axes namely a torque input axis said spin axis and a precessional axis and for imparting rotation to said mass about the torque input axis by the driving element, means to apply the precessional torque of said mass about the precessional axis to the driven member, said mass being articulated for controlled oscillation relative to the axis of spin and means to control said oscillation so that said driven member is subject chiefly to a unidirectional precessional torque arising from the rotation of said mass about the torque input and spin axes.

7. In a gyroscopic torque converter in combination a driving element, a driven element, a gyroscopic mass having a spin about a spin axis imposed thereon, means for mounting said mass for simultaneous rotation about three mutually transverse axes namely a torque input axis said spin axis and a precessional axis and for imparting rotation to said mass about the torque input axis by the driving element, and means to apply the precessional torque of said mass about the precessional axis to the driven element, said first named means including a supporting means for said mass adapting it for rotation with respect to said driving element about a fourth axis transverse to said spin axis under the action of inertia forces, and means to govern the rotation of the mass about said fourth axis to coordinate its rotation about said fourth axis with the rotation of said mass about one of said three axes so that said driven element is subject chiefly to unidirectional torques arising from the rotation of said mass about the said torque input and spin axes.

8. In a gyroscopic torque converter in combination a driving element, a driven element, a gyroscopic mass having a spin about a spin axis imposed thereon, means for mounting said mass for simultaneous rotation about three mutually transverse axes namely a torque input axis said spin axis and a precessional axis and for imparting rotation to said mass about the torque input axis by the driving element, means to apply the precessional torque of said mass about the precessional axis to the driven element, said gyroscopic mass being articulated for oscillation relative to said spin axis, and means to govern the oscillation of said mass in coordinated relation with the rotation of said mass about any of the other two axes forming with the spin axis the said three axes so that said driven element is subject chiefly to a unidirectional torque arising from the rotation of said mass about the torque input and precessional axes.

9. In a mechanism, in combination a driving element, a driven element, a gyroscopic mass, means for mounting said mass to receive simultaneous rotations imposed thereon about three mutually transverse axes namely a torque input axis a spin axis and a precessional axis, the rotation about the torque input axis being imposed by the said driving element, means to apply the precessional torque of said mass about the precessional axis to the driven element, and means to vary the radius of gyration of said mass about said spin axis in coordinated relation with the rotation of the mass about one of the other two axes of said set of three axes.

10. In a mechanism in combination a driving element, a driven element, a gyroscopic mass having a spin about a spin axis imposed thereon, means for mounting said mass for simultaneous rotation about three mutually transverse axes namely a torque input axis said spin axis and a precessional axis and for imparting rotation to said mass about the torque input axis by the driving element, said means for mounting being adapted for a complete turn of said mass about the torque input and precessional axes, means to apply the precessional torque of said mass about the precessional axis to the driven element, said means for mounting also including means adapting said mass for oscillation relative to said spin axis, and means to control said oscillation so that said driven member is subject chiefly to a unidirectional precessional torque arising from the rotation of said mass about the torque input and spin axis.

EDWARD A. STALKER.